UNITED STATES PATENT OFFICE.

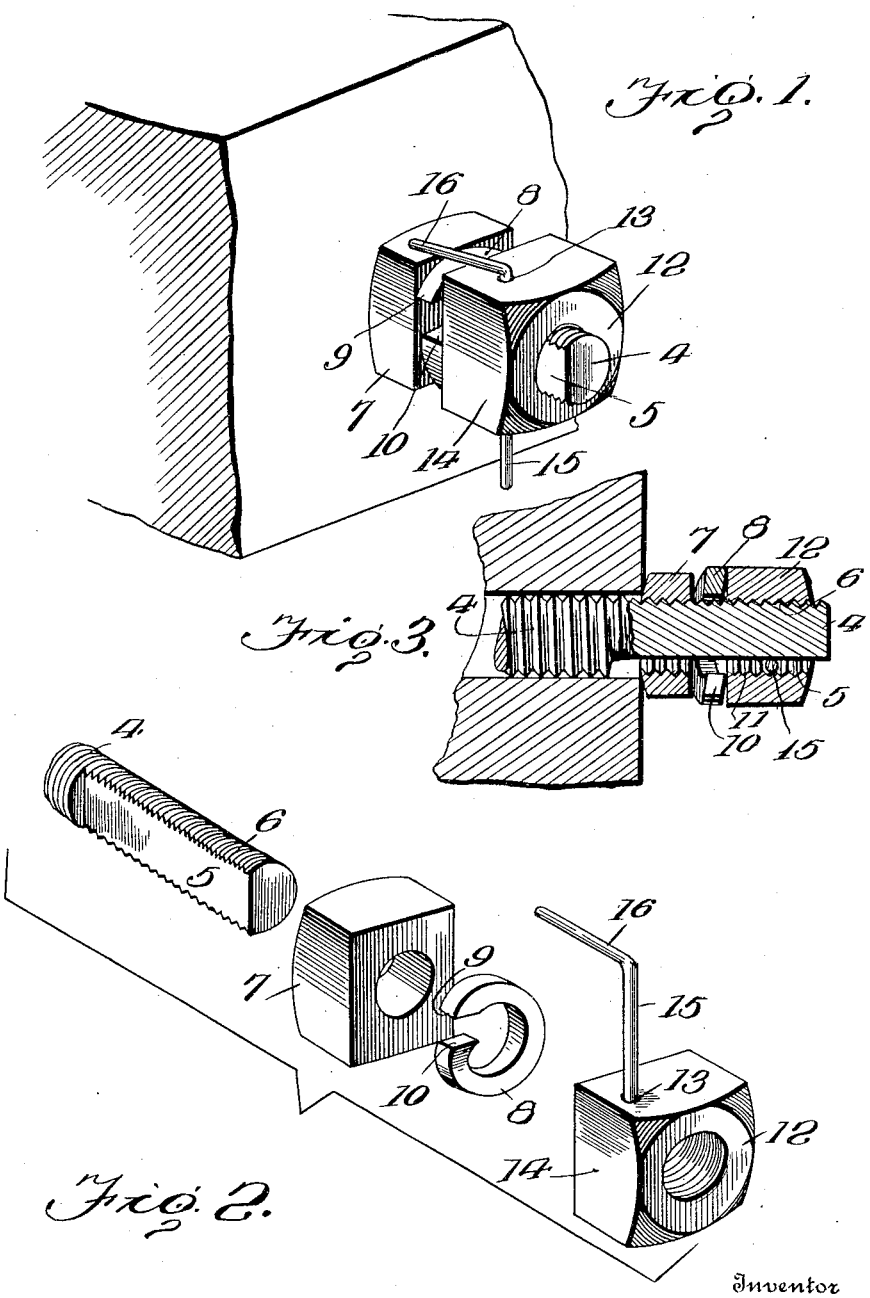

WILLIAM H. KEADLE, OF ALDERSON, WEST VIRGINIA, ASSIGNOR OF ONE-SIXTH TO H. B. ROWE, ONE-TWELFTH TO O. D. MASSEY, AND ONE TWENTY-FOURTH TO J. N. ALDERSON, ALL OF ALDERSON, WEST VIRGINIA, AND ONE TWENTY-FOURTH TO W. H. BURKHARDT, JR., OF LEESBURG, VIRGINIA, AND ONE-SIXTH TO WALTER HULLIHEN, OF SEWANEE, TENNESSEE.

NUT-LOCK.

1,198,452.     Specification of Letters Patent.     Patented Sept. 19, 1916.

Application filed October 30, 1915. Serial No. 58,817.

*To all whom it may concern:*

Be it known that I, WILLIAM H. KEADLE, a citizen of the United States, residing at Alderson, in the county of Greenbrier and State of West Virginia, have invented certain new and useful Improvements in Nut-Locks, of which the following is a specification.

This invention relates to nut-locks and more particularly to that class of such devices adapted to lock the holding nut in proper position by means of a spring washer engaged by a superposed nut held in locking position by means of a tangential key engaging a flattened portion on the bolt.

The primary object of this invention is the provision of a nut lock of the character set forth particularly designed for use under all suitable conditions and constructed to permit of installation with any sort of fastening.

A further object is to construct a device of the class described which shall be simple, inexpensive and positive of locking operation.

With the foregoing and other objects in view as will from time to time appear the invention consists in the peculiar combination and arrangement of the various coöperating elements of a nut lock as hereinafter described in the specification and more particularly set forth in the appended claims.

Referring to the drawings forming a portion of this specification and illustrating the preferred embodiment thereof and in which the same reference characters indicate the same parts wherever used: Figure 1 is a perspective view showing the device in locked position; Fig. 2 is a detail perspective view showing the parts in separated relation; and Fig. 3 is a detail section.

4 designates a bolt of any suitable type provided with a flattened portion 5 extending a portion of the length of the threaded portion 6. Upon the bolt 4 is placed the usual nut 7 reversed in order to present a flat surface to receive a spring locking washer 8 one tongue 9 of which bears upon the nut 7, the other tongue 10 engaging the face 11 of a second nut 12 threaded upon the bolt 4. The nut 12 is constructed with a hole 13 passing therethrough parallel to the side 14 of the nut 12 and adapted to aline with the flattened portion 5 of the bolt 4 to permit of the insertion of a key 15 bent at 16 to engage a face of the nut 7 to additionally prevent turning thereof and also to prevent accidental displacement of the key 15. The key 15 engaging the flattened portion 5 and the hole 13 prevents turning of the second nut 12 which bears upon the locking washer 8 to lock the nut 7 in position.

It will thus be seen that an effectual locking of the nut 7 is thereby effected securing the same against accidental displacement, removal thereof being effected by removing the key and the top nut.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

What I claim is:

1. A nut lock comprising, in combination, a threaded bolt having a flattened portion, a nut engaging said bolt, a spring washer adjacent said nut, a second nut engaging the washer, said second nut having an opening therethrough and a key engaging the opening, the flattened portion and the first named nut thereby to prevent rotation of both nuts.

2. A nut lock comprising, in combination, a threaded bolt having a flattened portion, a nut engaging said bolt, a spring washer adjacent said nut, a second nut engaging the washer, said second nut having an opening therethrough, and a key engaging the alined opening and flattened portion and a bent portion on said key adapted to engage the first nut to prevent rotation of both of said nuts.

In testimony whereof I affix my signature in presence of two witnesses.

WILLIAM H. KEADLE.

Witnesses:
H. B. ROWE,
F. L. BOONE.

Copies of this patent may be obtained for five cents each, by addressing the "Commissioner of Patents, Washington, D. C."